(12) United States Patent
Kana et al.

(10) Patent No.: US 11,714,200 B2
(45) Date of Patent: Aug. 1, 2023

(54) SINGLE-DIFFERENCE BASED PRE-FILTER OF MEASUREMENTS FOR USE IN SOLUTION SEPARATION FRAMEWORK

(71) Applicant: Honeywell International Inc., Morris Plains, NJ (US)

(72) Inventors: Zdenek Kana, Dubnany (CZ); Milos Sotak, Kosice-Saca (SK); Tomas Vaispacher, Brno (CZ)

(73) Assignee: Honeywell International Inc., Charlotte, NC (US)

( * ) Notice: Subject to any disclaimer, the term of this patent is extended or adjusted under 35 U.S.C. 154(b) by 406 days.

(21) Appl. No.: 16/823,199

(22) Filed: Mar. 18, 2020

(65) Prior Publication Data
US 2021/0293975 A1    Sep. 23, 2021

(51) Int. Cl.
*G01S 19/39* (2010.01)
*G01S 19/14* (2010.01)
*G01S 19/42* (2010.01)
*G01S 19/52* (2010.01)

(52) U.S. Cl.
CPC ............ *G01S 19/393* (2019.08); *G01S 19/14* (2013.01); *G01S 19/42* (2013.01); *G01S 19/52* (2013.01)

(58) Field of Classification Search
CPC ........ G01S 19/393; G01S 19/14; G01S 19/42; G01S 19/52; G01S 19/20; G01S 19/47; G01C 21/005; G01C 21/165; G01C 21/188; G01C 21/20
See application file for complete search history.

(56) References Cited

U.S. PATENT DOCUMENTS

| | | | |
|---|---|---|---|
| 6,166,683 | A | 12/2000 | Hwang |
| 6,664,923 | B1 | 12/2003 | Ford |
| 7,219,013 | B1 | 5/2007 | Young et al. |

(Continued)

OTHER PUBLICATIONS

Tanil et al., "Sequential Integrity Monitoring for Kalman Filter Innovations-Based Detectors", Proceedings of the 31st International Technical Meeting of the Satellite Division of the Institute of Navigation (ION GNSS+ 2018), Sep. 2018, pp. 2440-2455.

(Continued)

*Primary Examiner* — Yuen Wong
(74) *Attorney, Agent, or Firm* — Fogg & Powers LLC

(57) ABSTRACT

Systems and methods for a single-difference based pre-filter of measurements for use in solution separation framework are provided. In certain embodiments, a navigation system includes at least one receiver configured to receive a plurality of signals transmitted from a plurality of transmitters. The navigation system further includes a processing unit operatively coupled to the navigation system, the processor configured to identify a plurality of measurements associated with the plurality of transmitters. Additionally, executable instructions cause the processing unit to calculate an auxiliary navigation solution based on a calculated single difference between the plurality of measurements; calculate one or more single difference residuals for the auxiliary navigation solution; perform statistical tests on the one or more single difference residuals; and to identify a set of measurements in the plurality of measurements for use in a solution separation method based on the statistical tests.

9 Claims, 3 Drawing Sheets

(56) References Cited

U.S. PATENT DOCUMENTS

| | | | |
|---|---|---|---|
| 7,504,996 | B2 | 3/2009 | Martin |
| 8,378,890 | B2 | 2/2013 | Chopard et al. |
| 9,000,978 | B2 | 4/2015 | Riedinger et al. |
| 9,291,714 | B2 | 3/2016 | Vourc'h |
| 2009/0146873 | A1 | 6/2009 | Vanderwerf |
| 2009/0150074 | A1 | 6/2009 | Vanderwerf |
| 2011/0115669 | A1* | 5/2011 | Milyutin .............. G01S 19/20 342/357.27 |
| 2013/0120187 | A1 | 5/2013 | Dai et al. |
| 2015/0219766 | A1 | 8/2015 | Weed et al. |

OTHER PUBLICATIONS

U.S. Patent and Trademark Office, "Office Action", U.S. Appl. No. 16/823,105, dated Feb. 14, 2022, pp. 1 through 32, Published: US.
European Patent Office, "Extended European Search Report from EP Application No. 21161136.3", from Foreign Counterpart to U.S. Appl. No. 16/823,199, dated Aug. 3, 2021, pp. 1 through 9, Published: EP.
Liang et al. "GNSS Mullti-Frequency Multi-System Highly Robust Differential Positioning Based on an Autonomous Fault Detection and Exclusion Method", Special Section on Advanced Data Analytics for Large-Scale Complex Data Environments, Nov. 1, 2017, pp. 26842 through 26851, vol. 5, IEEE.
Offer et al. "Use of Inertial Integration to Enhance Availability for Shipboard Relative GPS (SRGPS)", ION GNSS 19th International Technical Meeting of the Satellite Division, Sep. 2006, pp. 726 through 737, Fort Worth, TX.
Brenner "Integrated GPS/Inertial Fault Detection Availability", Navigation: Journal of the Institute of Navigation, Summer 1996, pp. 111 through 130, vol. 43, No. 2.
European Patent Office, "Extended European Search Report from EP Applicatation No. 21161135.5", from Foreign Counterpart to U.S. Appl. No. 16/823,105, dated Aug. 24, 2021, pp. 1 through 10, Published: EP.
Feng et al. "Integrity Monitoring for Precise Point Positioning", Proceedings of the 27th International Technical Meeting of the ION Satellite Division, ION GNSS+ 2014, Sep. 2014, pp. 986 through 1007, Imperial College London.
U.S. Patent and Trademark Office, "Notice of Allowance", U.S. Appl. No. 16/823,105, dated May 27, 2022, pp. 1 through 10, Published: US.
European Patent Office, "Communication pursuant to Article 94(3) EPC", from EP Application No. 21161136.3, from Foreign Counterpart to U.S. Appl. No. 16/823,199, dated Feb. 8, 2023, pp. 1 through 5, Published: EP.

* cited by examiner

SINGLE-DIFFERENCE BASED PRE-FILTER OF MEASUREMENTS FOR USE IN SOLUTION SEPARATION FRAMEWORK

BACKGROUND

Vehicles (and sometimes objects) frequently have navigation systems that acquire information about the movement, position, and orientation of the vehicle. The navigation systems use this information to calculate navigation data from the acquired information. To acquire the information used to calculate the navigation data, some navigation systems may include a sensor set having an inertial measurement unit (IMU) and/or a GNSS antenna/receiver that provides measurements related to vehicle movement and vehicle position. Additionally, the navigation system may process the measurements using a Kalman filter to estimate the position, velocity, and angular orientation of the vehicle relative to defined reference frames and apply corrections to the measurements provided by the sensors.

Additionally, some navigation systems are used in safety-critical navigation applications. In safety-critical navigation applications, it is important to ensure that the sensors are providing reliable measurements. Accordingly, the measurements and other output provided by the sensors may be continuously monitored to gauge the health of the sensors and the integrity of measurements provided by the sensors in the navigation system.

Frequently, monitoring the health and integrity of the sensors within the navigation system is achieved by exploiting the redundancy in the sensor measurements provided by the various sensors, and by using probabilistic algorithms to detect faults and estimate kinematic errors during fault free operations. One example of a method used to monitor the integrity of measurements used by a navigation system is a solution separation method.

SUMMARY

Systems and methods for a single-difference based pre-filter of measurements for use in solution separation framework are provided. In certain embodiments, a navigation system includes at least one receiver configured to receive a plurality of signals transmitted from a plurality of transmitters. The navigation system further includes a processing unit operatively coupled to the navigation system, the processor configured to identify a plurality of measurements associated with the plurality of transmitters. Additionally, executable instructions cause the processing unit to calculate an auxiliary navigation solution based on a calculated single difference between the plurality of measurements. Further, executable instructions cause the processing unit to calculate one or more single difference residuals for the auxiliary navigation solution. Also, executable instructions cause the processing unit to perform statistical tests on the one or more single difference residuals. Moreover, the executable instruction cause the processing unit to identify a set of measurements in the plurality of measurements for use in a solution separation method based on the statistical tests.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made.

Systems and methods for pre-filtering measurements for use in a solution separation framework are described herein. In particular, using acquired measurements, an auxiliary filter may be processed. Methods and systems described herein may be applicable for addressing measurements with a common error source which common errors cannot be predicted with sufficient quality, i.e. the GNSS receiver clock error in GNSS measurements. The auxiliary filter may calculate a single difference on measurements and then apply innovation sequence monitoring to the single difference. Based on the applied innovation sequence, the system may identify faulty measurements. The faulty measurements may then be excluded from a subsequently processed solution separation algorithm. For example, a processing unit may exclude the faulty measurements from subsequently processed main filters, sub-filters, and sub-sub-filters when executing a solution separation algorithm for faults detection and exclusion. By calculating a single difference and then applying innovation sequence monitoring to the single difference to identify faulty measurements, a processing unit may remove the effects of some errors that affect the received measurements.

Figure 1:
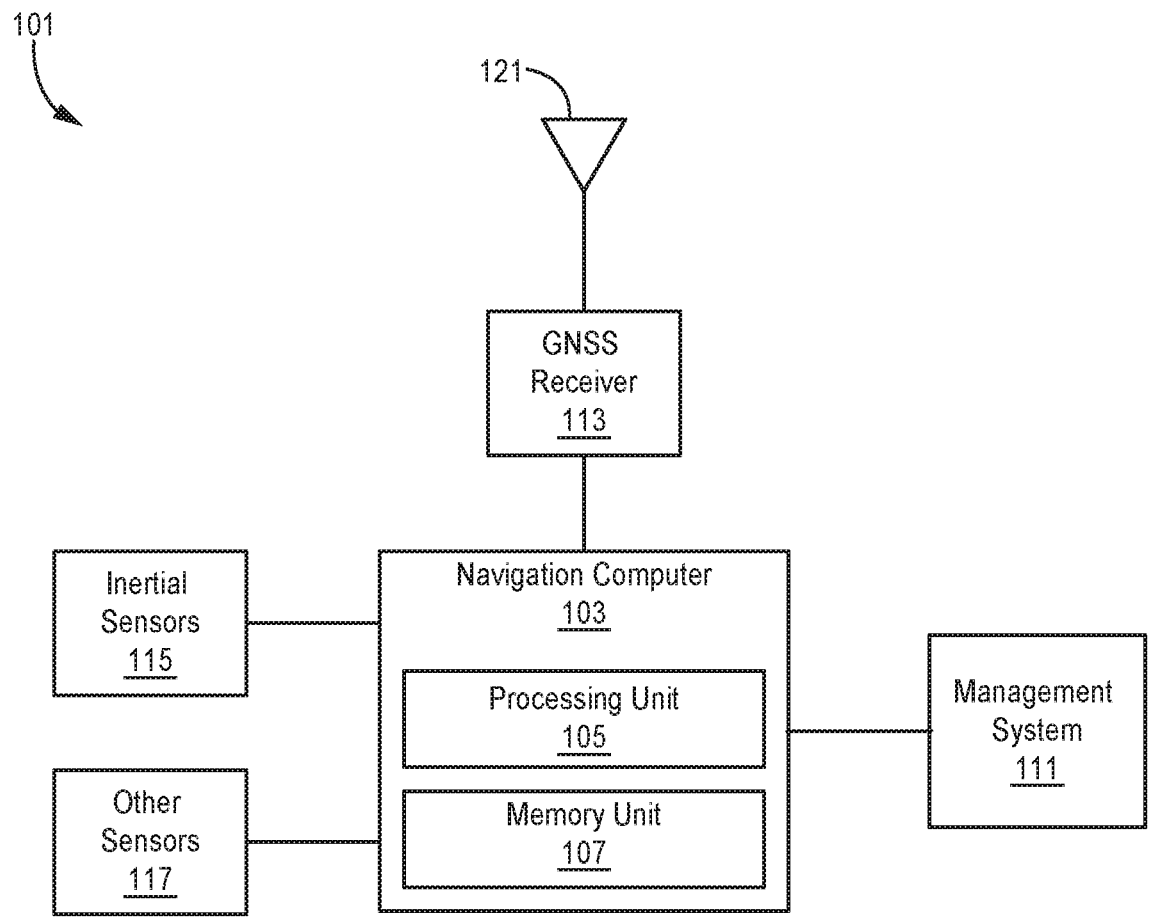
FIG. 1 is a block diagram illustrating an exemplary navigation system according to an aspect of the present disclosure.

FIG. 1 is a block diagram of a navigation system 101 that is capable of pre-filtering measurements for use in a solution separation framework. The navigation system 101 may be mounted to a vehicle, such as an aircraft, sea craft, spacecraft, automobile, or other type of vehicle. Alternatively, the navigation system 101 may be located on or as part of a movable object, such as a phone, personal electronics, land surveying equipment, or other object that is capable of being moved from one location to another. Additionally, the navigation system 101 may acquire navigation information from one or more different sources. To handle the acquired navigation information, the navigation system 101 may include a navigation computer 103. The navigation computer 103 may further include at least one processing unit 105 and at least one memory unit 107.

In certain embodiments, the navigation system 101 may acquire navigation information that includes inertial motion information. To acquire the inertial motion information, the navigation system 101 may include inertial sensors 115 that measure and sense the inertial motion of the object mounted to the navigation system 101. For example, the navigation system 101 may be an inertial navigation system (INS) that receives raw inertial data from a combination of inertial sensors 115, such as gyroscopes and accelerometers. Alternatively, the inertial sensors 115 may be an INS that provides processed inertial navigation data acquired from inertial measurements to the navigation computer 103.

In further embodiments, the navigation system 101 may include a number of additional sensors that can provide navigation data. For example, the navigation system 101 may include one or more other sensors 117. For example, the one or more other sensors 117 may include a vertical position sensor such as an altimeter. Also, the one or more other sensors 117 may include electro-optical sensors, magnetometers, barometric sensors, velocimeters, and/or other types of sensors.

In certain embodiments, the navigation system 101 may use GNSS measurements to determine navigation information, the navigation system 101 may include a GNSS receiver 113 with at least one antenna 121 that receives satellite signals from multiple GNSS satellites that are observable to the at least one antenna 121. For example, during operation, the GNSS receiver 113 may receive GNSS satellite signals from the presently observable GNSS satellites. As used herein, the GNSS satellites may be any combination of satellites that provide navigation signals. For example, the GNSS satellites may be part of the global positioning system (GPS), GLONASS, Galileo system, COMPASS (BeiDou), or other system of satellites that form part of a GNSS. The GNSS satellites may provide information that can be used for navigational purposes. The processing unit 105 and GNSS receiver 113 may receive the satellite signals and extract position, velocity, and time data from the signals to acquire pseudorange measurements.

The processing unit 105 and/or other computational devices used in the navigation system 101, management system 111, or other systems and methods described herein may be implemented using software, firmware, hardware, or appropriate combination thereof. The processing unit 105 and other computational devices may be supplemented by, or incorporated in, specially-designed application-specific integrated circuits (ASICs) or field programmable gate arrays (FPGAs). In some implementations, the processing unit 105 and/or other computational devices may communicate through an additional transceiver with other computing devices outside of the navigation system 101, such as those associated with the management system 111 or computing devices associated with other subsystems controlled by the management system 111. The processing unit 105 and other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor, such as the processing unit 105. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device. For instance, the memory unit 107 may be an example of a computer readable medium capable of storing computer readable instructions and/or data structures. Also, the memory unit 107 may store navigational information such as maps, terrain databases, magnetic field information, path data, and other navigation information.

Suitable computer readable storage media (such as the memory unit 107) may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

In certain embodiments, navigation measurements may be subject to various errors and faults. To account for faults that may exist in the measurements, the navigation computer 103 may monitor the integrity of the various measurements used while navigating. For example, the processing unit 105 may receive signals from the GNSS receiver 113 conveying measurements associated with the different GNSS satellites in communication with the GNSS receiver 113. The processing unit 105 may then monitor the integrity of the signals. As used herein, integrity is a measure of the level of trust that can be placed in the correctness of the information supplied for use by a navigation system 101. A system that performs integrity monitoring may monitor the integrity of the various measurements during the operation of the navigation system 101. To perform integrity monitoring, systems may implement integrity monitoring algorithms.

In certain embodiments, integrity monitoring algorithms are based on a solution separation methodology. In a solution separation methodology, a system (such as the navigation system 101) may determine a full solution and one or more sub-solutions, where the full solution is calculated based on information acquired from a set of information sources and the sub-solutions are calculated based on information acquired from subsets of the set of information sources. Using the full solution and the sub-solutions, a system may determine the integrity of the full solution. For example, using the full solution and the sub-solutions, the system may determine whether or not a measurement is faulty. Additionally, executed integrity monitoring algorithms may calculate sub-sub-solutions that are solutions based on subsets of the subsets of the information used for each sub-solution. The executed integrity monitoring algorithm may use the sub-sub-solutions to identify which measurement sources are faulty and then exclude the measurements produced by faulty sources from calculations of navigation information.

In some implementations, the solution separation methodology may be used to determine the integrity of solutions calculated using information acquired from GNSS navigation satellites. For example, the main position solution may incorporate a set of pseudoranges from available satellites that are integrated with inertial sensor measurements, where the sub-solutions are based on a subset of the pseudoranges from the available satellites and the sub-sub-solutions are based on subsets of the subsets of the pseudoranges. The system may then determine the protection levels for the main position solution based on differences or separations between the main position solution and the sub-solutions.

Also, the system may exclude pseudoranges that are determined to be faulty. Additionally, the executed integrity monitoring algorithm may use full solution estimates, sub-solution estimates, dependence among the full solution and setoff sub-solutions, probabilities of missed detection, and probabilities of false alert to detect faults and compute protection levels.

In frequent embodiments, the navigation computer 103 may use filtering (such as Kalman filtering or other filtering technique) to combine measurements acquired through the GNSS receiver 113 with measurements acquired from the inertial sensors 115 and the other sensors 117. When the navigation computer 103 uses a Kalman filter to combine measurements, the navigation computer 103 may use a dynamic model, control inputs of the navigation system 101, and multiple sequential measurements acquired from the inertial sensors 115, the other sensors 117, and through the GNSS receiver 113 to form an estimate of navigation parameters for the navigation system 101 that is better than measurements acquired from any one of the individual measurement sources.

When implementing a Kalman filter, the navigation computer 103 (or other computing system in communication with the navigation computer 103) may perform a prediction step and an update step. In the prediction step, the navigation computer 103 may predict a state estimate and an estimate covariance of a navigation solution for the navigation system 101. In the update step, the navigation computer 103 may create weighted measurements by applying a Kalman gain to measurements acquired from the measurement sources and add the weighted measurements to the predicted state estimate calculated in the prediction step. Further, when performing the update step, the navigation computer 103 may calculate an innovation (also known as a residual). To calculate the innovation, the navigation computer 103 may compare the observed measurements against the predicted state estimates. While the calculations by navigation computer 103 have been described as applying to Kalman filtering, it may also apply to Extended Kalman filter (EKF), Unscented Kalman filter, and other statistical filters. For example, an EKF may be applied when integrating INS and GNSS measurements.

Frequently, hybrid systems that combine measurements like GNSS and INS measurements (like the navigation computer 103) may perform innovation sequence monitoring. As described herein, innovation sequence monitoring may refer to the application of statistical tests on the calculated innovations or measurement residuals. For example, the navigation computer 103 may calculate the innovations and perform a chi-square, Gaussian, or other statistical test on the innovations. The navigation computer 103 may use the results from the innovation sequence monitoring to identify faulty or erroneous measurements and exclude those measurements from subsequent processing. However, when performing the innovation sequence monitoring with GNSS measurements, the confidence in the residual test may be very poor due to the prediction of GNSS receiver clocks. For example, when performing sequential measurement processing, a GPS receiver clock bias may be estimated based on a first processed measurement. If that first processed measurement is faulty or erroneous, the receiver clock bias estimate may cause the resultant navigation solution to also be faulty or erroneous.

In certain embodiments, the navigation computer 103 may remove the effects of GNSS receiver clock errors and/or other measurement common sources of errors by calculating a single difference and using the results of the single difference within an auxiliary filter. As used herein, a single difference may refer to a difference between different measurements associated with different measurement sources. For example, the navigation computer 103 may calculate a single difference by calculating the differences between a measurement provided by a first measurement source and the measurements provided by the other measurement sources.

In certain embodiments, where the measurements are pseudoranges, the navigation computer 103 may calculate a single difference by calculating pseudorange measurement differences and using the results of the calculated pseudorange measurement differences within an auxiliary filter. As used herein, a pseudorange measurement difference may refer to a difference between pseudoranges associated with different satellites. For example, the navigation computer 103 may calculate a difference between a pseudorange associated with a first satellite and a pseudorange associated with a second satellite.

In certain embodiments, the navigation computer 103 implements the pseudorange measurement differences within an auxiliary filter by implementing a statistical filter for the pseudorange measurement differences processing. For example, the navigation computer 103 may calculate the differences between a first pseudorange and each of the other available pseudoranges. The navigation computer 103 may then calculate predicted states of the pseudorange measurement differences and calculate updates for the pseudorange measurement differences. As part of calculating the updates, the navigation computer 103 may perform innovation sequence monitoring on the pseudorange measurement differences.

As part of the innovation sequence monitoring, the navigation computer 103 may perform a statistical test to determine if the calculated innovations for any of the pseudorange measurement differences are indicative of errors or faults in the measurements acquired from the various GNSS satellites. For example, the navigation computer 103 may perform a chi-square test, a Gaussian test, comparison of the innovation to a threshold value, or other test on the innovations of the pseudorange measurement differences. If an innovation fails or part of the test fails, the navigation computer 103 may deploy logic to find the faulty pseudo range measurement. When the faulty pseudorange measurement is identified, the navigation computer 103 may exclude the faulty pseudorange measurement from subsequent calculations.

In certain embodiments, after performing the innovation sequence monitoring within the auxiliary filter, the navigation computer 103 may then proceed to performing the standard solution separation method using the pseudoranges that passed the statistical test. For example, if the navigation computer 103 determines that a pseudorange associated with the third of six satellites is faulty, the navigation computer 103 may then perform the solution separation method excluding the faulty pseudorange.

Figure 2:
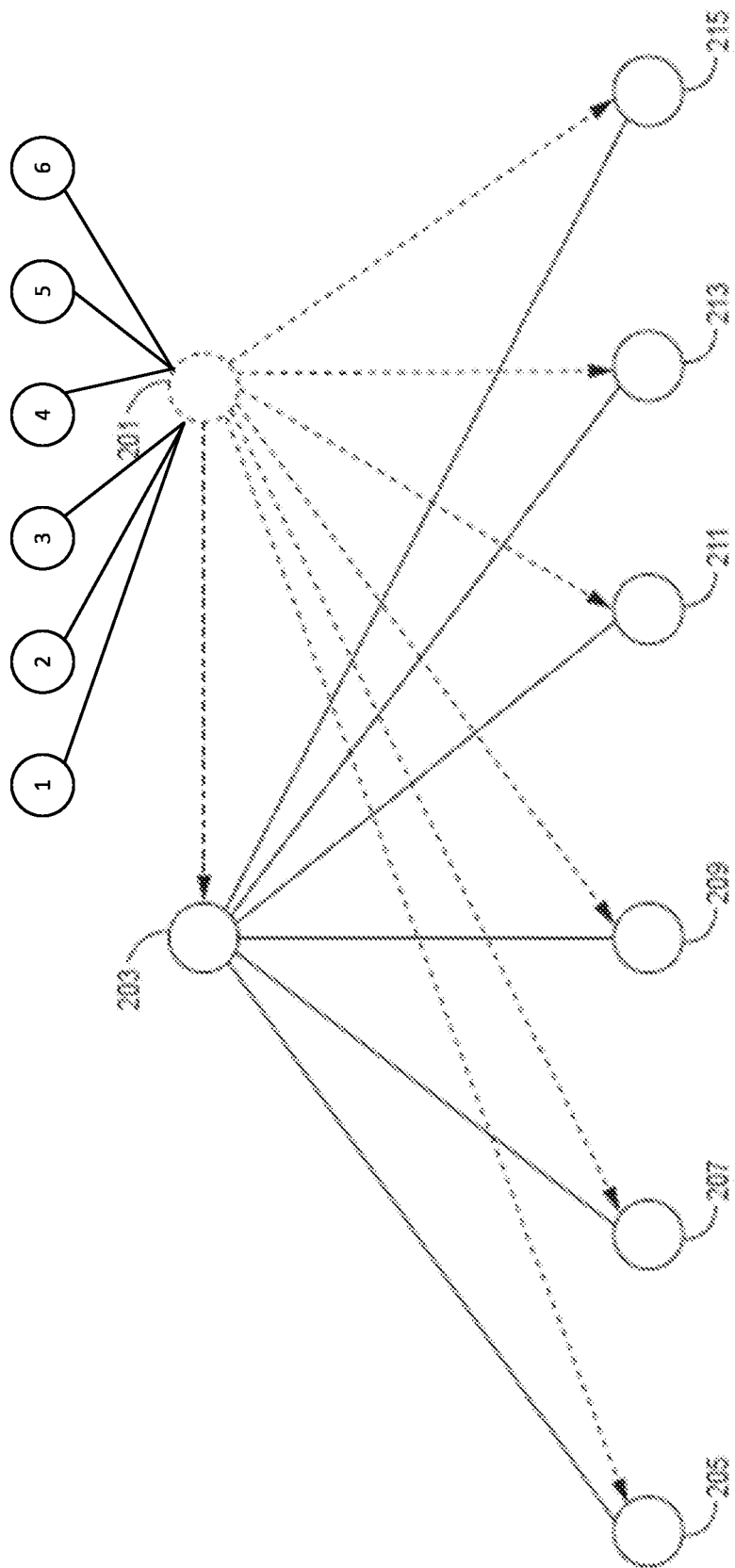
FIG. 2 is a block diagram illustrating the use of an auxiliary filter within a solution separation methodology according to an aspect of the present disclosure.

FIG. 2 is a diagram illustrating the use of an auxiliary filter 201 within a solution separation method. As shown, the calculation of the auxiliary filter 201 may be performed separately from the performed solution separation method. As described above, when executing the auxiliary filter 201, the navigation computer 103 may perform innovation sequence monitoring on the pseudorange measurement differences. For example, as shown in FIG. 2, there may be pseudorange measurements associated with six satellites. Accordingly, the navigation computer 103 may calculate the pseudorange measurement differences by individually subtracting the pseudorange measurements for the second through sixth satellites from the pseudorange measurement for the first satellite (1-2, 1-3, 1-4, 1-5, and 1-6).

The navigation computer 103 may calculate a solution using a statistical filter using the pseudorange measurement differences, if the innovation fails a statistical test (like the chi-square test), the navigation computer 103 may execute logic to determine which satellites are providing faulty pseudorange measurements. When the navigation computer 103 determines that one or more satellites are providing faulty pseudorange measurements, the navigation computer 103 may then perform the solution separation method using the non-faulty pseudorange measurements not deploying the single measurements differences.

When performing the solution separation method, after implementing the auxiliary filter, the navigation computer 103 may calculate a main solution 203 using all the available pseudorange measurements that are not faulty or erroneous as determined by the auxiliary filter 201. For example, if the auxiliary filter 201 determined that none of the pseudoranges were faulty or erroneous, the navigation computer 103 may calculate the main solution 203 using all of the available pseudoranges (satellites 1-6). However, if the auxiliary filter 201 identified a faulty or erroneous pseudorange measurement, the navigation computer 103 may calculate the main solution 203 using the non-faulty/non-erroneous pseudorange measurements. For example, if the auxiliary filter 201 determined that faulty or erroneous pseudorange measurements were associated with a fourth satellite, the navigation computer 103 may calculate the main solution using the other non-faulty/non-erroneous pseudorange measurements (satellites 1-3 and 5-6).

In certain embodiments, in conjunction with calculating the main solution 203, the navigation computer 103 may also calculate sub-solutions for the various non-faulty/non-erroneous pseudorange measurements. The navigation computer 103 may calculate sub-solutions by calculating separate sub-solutions for each satellite by excluding a pseudorange measurement provided by a single satellite. As illustrated, there are six sub-solutions 205, 207, 209, 211, 213, and 215. In the first sub-solution 205, the navigation computer 103 may calculate a solution that excludes the pseudorange measurement associated with a first satellite. In other words, the first sub-solution 205 may be calculated using pseudoranges associated with satellites 2 to 6. In a similar manner, the second sub-solution 207 may be calculated using pseudoranges associated with satellites 1 and 3 to 6; the third sub-solution 209 may be calculated using pseudoranges associated with satellites 1, 2 and 4 to 6; the fourth sub-solution 211 may be calculated using pseudoranges associated with satellites 1 to 3, 5, and 6; the fifth sub-solution 213 may be calculated using pseudoranges associated with satellites 1 to 4 and 6; and the sixth sub-solution 215 may be calculated using pseudoranges associated with satellites 1 to 5. Additionally, while not shown, the navigation computer 103 may also calculate multiple sub-sub-solutions in accordance with a solution separation methodology for faults exclusion.

In some embodiments, when the navigation computer 103 determines that one or more pseudorange measurements are faulty or erroneous based on the auxiliary filter 201, the navigation computer 103 may exclude faulty/erroneous pseudorange measurements from being used in the calculation of the sub-solutions. For example, when six satellites are visible and the navigation computer 103 determines that the pseudorange measurement associated with the third satellite is faulty or erroneous, the pseudorange measurement associated with the third satellite may be excluded from the calculations of the various sub-solutions. For instance, when the third satellite is associated with a faulty or erroneous pseudorange, the navigation computer 103 may calculate the sub-solutions 205, 207, 211, 213, and 215. In other words, the navigation computer 103 may not calculate the sub-solution 209. Additionally, when calculating the sub-solutions, the navigation computer 103 may calculate the first sub-solution 205 using pseudoranges associated with the satellites 2 and 4 to 6. In a similar manner, the navigation computer 103 may calculate the second sub-solution 207 using pseudoranges associated with the satellites 1 and 4 to 6; the fourth sub-solution 211 using pseudoranges associated with the satellites 1, 2, 5, and 6; the fifth sub-solution 213 using pseudoranges associated with the satellites 1, 2, 4, and 6; and the sixth sub-solution 215 using pseudoranges associated with the satellites 1, 2, 4, and 5. In a similar manner, the navigation computer 103 may calculate multiple sub-sub-solutions in accordance with solution separation methodologies.

Figure 3:
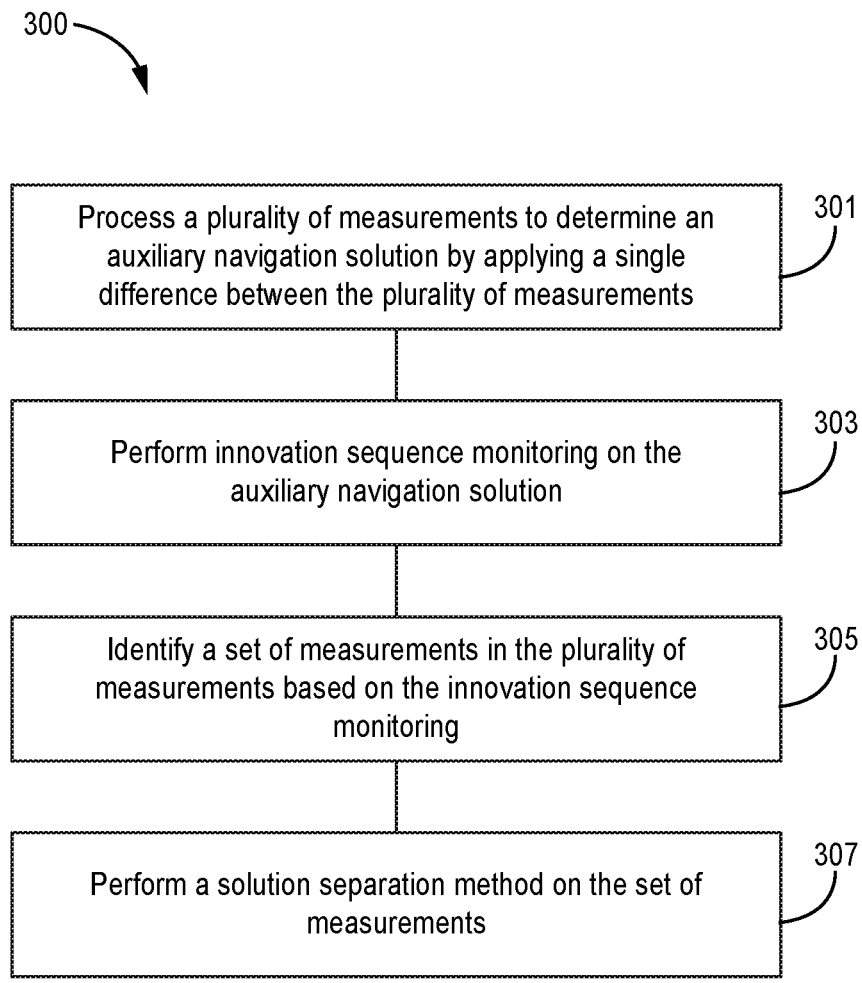
FIG. 3 is a flowchart diagram illustrating an exemplary method for pre-filtering measurements for use in a solution separation framework according to an aspect of the present disclosure.

FIG. 3 is a flowchart diagram illustrating an exemplary method 300 for pre-filtering measurements for use in a solution separation framework. The method 300 proceeds at 301, where a plurality of measurements are processed to determine an auxiliary navigation solution by applying a single difference between the plurality of measurements. Additionally, the method 300 may proceed at 303, where innovation sequence monitoring is performed on the auxiliary navigation solution. Further, the method 300 may proceed at 305, where a set of measurements are identified in the plurality of measurements based on the innovation sequence monitoring. Moreover, the method may proceed at 307, where a solution separation method may be performed on the set of measurements.

EXAMPLE EMBODIMENTS

Example 1 includes a method comprising: processing a plurality of measurements to determine an auxiliary navigation solution by applying a single difference between the plurality of measurements; performing innovation sequence monitoring on the auxiliary navigation solution; identifying a set of measurements in the plurality of measurements based on the innovation sequence monitoring; and performing a solution separation method on the set of measurements.

Example 2 includes the method of Example 1, wherein identifying a set of measurements further comprises including measurements having single difference residuals that pass a statistical tests in the set of measurements.

Example 3 includes the method of Example 2, wherein the statistical test comprises at least one of: a Chi-squared test; and a Gaussian test.

Example 4 includes the method of any of Examples 1-3, wherein the solution separation method comprises: processing the set of measurements to determine a full navigation solution; processing subsets of the set of measurements to determine a set of navigation sub-solutions.

Example 5 includes the method of Example 4, further comprising: comparing the set of navigation sub-solutions to the full navigation solution; detecting faults and computing protection levels of quantities of a navigation solution based on a full navigation solution estimate, navigation sub-solutions estimates, dependence among the full navigation solution and the set of navigation sub-solutions, and probabilities of missed detections and false alerts.

Example 6 includes the method of any of Examples 4-5, further comprising processing subsets of the subsets of the set of measurements to determine a set of navigation sub-sub-solutions.

Example 7 includes the method of Example 6, further comprising excluding measurements in the set of measurements based on the set of navigation sub-sub-solutions.

Example 8 includes the method of any of Examples 1-7, wherein performing innovation sequence monitoring on the auxiliary navigation solution comprises calculating measurement residuals of statistical filter used to process the plurality of measurements and applying a statistical test to monitor the measurement residuals or innovation sequence.

Example 9 includes the method of Example 8, wherein the statistical filter is at least one of: a Kalman filter; an extended Kalman filter; and an Unscented Kalman filter.

Example 10 includes the method of any of Examples 1-9, wherein a measurement in the plurality of measurements is a pseudorange measurement.

Example 11 includes a navigation system comprising: at least one receiver configured to receive a plurality of signals transmitted from a plurality of transmitters; and a processing unit operatively coupled to the navigation system, the processor configured to identify a plurality of measurements associated with the plurality of transmitters, wherein executable instructions cause the processing unit to: calculate an auxiliary navigation solution based on a calculated single difference between the plurality of measurements; calculate one or more single difference residuals for the auxiliary navigation solution; perform statistical tests on the one or more single difference residuals; and identify a set of measurements in the plurality of measurements for use in a solution separation method based on the statistical tests.

Example 12 includes the system of Example 11, wherein the executable instructions further cause the processing unit to include a measurement from the plurality of measurements in the set of identified measurements when the statistical tests performed on the single difference residuals to the measurement are passed.

Example 13 includes the system of any of Examples 11-12, wherein the statistical test is at least one of: a Chi-squared test; and a Gaussian test.

Example 14 includes the system of any of Examples 11-13, wherein the solution separation method comprises: processing the set of measurements to determine a full navigation solution; processing subsets of the set of measurements to determine a set of navigation sub-solutions.

Example 15 includes the system of Example 14, wherein the executable instructions further cause the processing unit to: compare the set of navigation sub-solutions to the full navigation solution; detect faults and computing protection levels of quantities of a navigation solution based on a full navigation solution estimate, navigation sub-solutions estimates, dependence among the full navigation solution and the set of navigation sub-solutions, and probabilities of missed detections and false alerts.

Example 16 includes the system of any of Examples 14-15, wherein the executable instructions further cause the processing unit to process subsets of the subsets of the set of measurements to determine a set of navigation sub-sub-solutions.

Example 17 includes the system of Example 16, wherein the executable instructions further cause the processing unit to exclude measurements in the set of measurements based on the set of navigation sub-sub-solutions.

Example 18 includes the system of any of Examples 11-17, wherein the processing unit calculates the one or more single difference residuals as part of a statistical filter used to process the plurality of measurements.

Example 19 includes the system of Example 18, wherein the statistical filter is at least one of: a Kalman filter; an Extended Kalman filter; and an Unscented Kalman filter.

Example 20 includes a navigation system comprising: at least one global navigation satellite system (GNSS) receiver configured to receive a plurality of signals transmitted from a plurality of GNSS satellites; and a processing unit operatively coupled to the navigation system, the processor configured to identify a plurality of pseudorange measurements associated with the plurality of GNSS satellites, wherein executable instructions cause the processing unit to: calculate an auxiliary navigation solution based on a calculated single difference between the plurality of pseudorange measurements; perform innovation sequence monitoring as part of implementing a statistical filter; and perform a solution separation method on a set of pseudorange measurements in the plurality of pseudorange measurements, wherein the pseudorange measurements in the set of pseudorange measurements are selected based on the innovation sequence monitoring.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof

What is claimed is:

1. A navigation system comprising:
   at least one receiver configured to receive a plurality of signals transmitted from a plurality of transmitters; and
   a processing unit, including a processor, operatively coupled to the navigation system, the processing unit configured to identify a plurality of measurements associated with the plurality of transmitters, wherein executable instructions cause the processing unit to:
   calculate an auxiliary navigation solution for a vehicle based on a calculated single difference between the plurality of measurements;
   calculate one or more single difference residuals for the auxiliary navigation solution;
   perform statistical tests on the one or more single difference residuals;
   identify a set of measurements in the plurality of measurements that pass the performed statistical tests for use in a solution separation method;
   determine integrity of the set of measurements by performing the solution separation method using the set of measurements to determine a full navigation solution and a set of navigation sub-solutions for the solution separation method; and
   exclude at least one measurement which is faulty from the set of measurements from subsequently processed main filters, sub-filters, and sub-sub-filters when performing the solution separation method for faults detection and exclusion.

2. The system of claim 1, wherein the executable instructions further cause the processing unit to include a measurement from the plurality of measurements in the set of identified measurements when the statistical tests performed on the single difference residuals to the measurement are passed.

3. The system of claim 1, wherein the statistical test is at least one of:
a Chi-squared test; and
a Gaussian test.

4. The system of claim 1, wherein the executable instructions further cause the processing unit to:
compare the set of navigation sub-solutions to the full navigation solution;
detect faults and computing protection levels of quantities of a navigation solution based on a full navigation solution estimate, navigation sub-solutions estimates, dependence among the full navigation solution and the set of navigation sub-solutions, and probabilities of missed detections and false alerts.

5. The system of claim 1, wherein the executable instructions further cause the processing unit to process subsets of subsets of the set of measurements to determine a set of navigation sub-sub-solutions.

6. The system of claim 5, wherein the executable instructions further cause the processing unit to exclude measurements in the set of measurements based on the set of navigation sub-sub-solutions.

7. The system of claim 1, wherein the processing unit calculates the one or more single difference residuals as part of a statistical filter used to process the plurality of measurements.

8. The system of claim 7, wherein the statistical filter is at least one of:
a Kalman filter;
an Extended Kalman filter; and
an Unscented Kalman filter.

9. The system of claim 1, wherein a measurement in the plurality of measurements is a pseudorange measurement.

* * * * *